United States Patent [19]

Gustafson

[11] 4,243,316
[45] Jan. 6, 1981

[54] REGISTRATION MECHANISM
[75] Inventor: Gary B. Gustafson, Hilton, N.Y.
[73] Assignee: Eastman Kodak Company, Rochester, N.Y.
[21] Appl. No.: 60,542
[22] Filed: Jul. 25, 1979
[51] Int. Cl.³ .............................................. G03B 27/62
[52] U.S. Cl. ....................................... 355/75; 271/3; 271/6; 271/245; 355/3 SH; 355/50
[58] Field of Search ................... 355/75, 3 SH, 50, 51, 355/8; 271/226, 245, 253, 6, 3

[56]          References Cited
         U.S. PATENT DOCUMENTS

| | | | |
|---|---|---|---|
| 3,804,514 | 4/1974 | Jasinski | 355/75 |
| 3,844,552 | 10/1974 | Bleau et al. | 271/245 |
| 3,937,454 | 2/1976 | Colwill | 271/6 |
| 4,023,791 | 5/1977 | Hori et al. | 271/3 |
| 4,076,408 | 2/1978 | Reid et al. | 355/14 |
| 4,169,674 | 10/1979 | Russel | 355/3 R |

OTHER PUBLICATIONS

"Research Disclosure", Industrial Opportunities, Ltd., Homewell, Havant, Hampshire, United Kingdom, Apr. 1969, p. 169.
IBM Technical Disclosure Bulletin, vol. 17, No. 4, Published Sep. 1974, p. 1131.
IBM Technical Disclosure Bulletin, vol. 19, No. 12, Published, May 1977, p. 4496.

Primary Examiner—Richard A. Wintercorn
Attorney, Agent, or Firm—G. Herman Childress

[57] ABSTRACT

A registration mechanism registers document sheets on a copier platen at an edge of the platen surface. The mechanism includes a unique gate member that moves relative to the platen edge to either register a document sheet or to permit the sheet to be driven past the edge and over a sheet deflector. For duplex copying, the deflector can be raised to guide the leading edge of the sheet over the platen edge as the sheet is returned to the platen for copying a second side of the sheet.

7 Claims, 4 Drawing Figures

REGISTRATION MECHANISM

FIELD OF THE INVENTION

This invention relates to registration mechanisms for registering document sheets on a platen of a copier/duplicator or the like. More particularly, the invention relates to such a registration mechanism wherein the document sheet can be registered on the platen, driven past the registration mechanism, inverted and returned to the platen past the registration mechanism, and then registered a second time for copying both sides of the document sheet.

DESCRIPTION OF THE PRIOR ART

Copiers/Duplicators use registration mechanisms of various types for registering document sheets on a platen for copying. Some registration mechanisms are carried by the copier main frame and have a registration member that is movable upwardly to a registration position for engagement by document sheets to thereby register the sheets. The registration member is then moved downwardly out of the sheet path for removal of the document sheet. When the copier is provided with a document feeder, such as a recirculating document feeder, then the registration mechanism may be included in the recirculating feeder. A feeder having a gate mechanism therein is disclosed in U.S. Pat. No. 4,169,674, which issued on Oct. 2, 1979 in the name of Matthew J. Russel, such patent issuing from the copending U.S. patent application Ser. No. 647,683 filed Jan. 8, 1976 (now U.S. Pat. No. 4,169,674, issued Oct. 2, 1979), such application being a continuation of abandoned U.S. application Ser. No. 523,610, filed Nov. 13, 1974. Belgium Pat. No. 835,568 and British Pat. No. 1,492,466 are based on the disclosure in U.S. application Ser. No. 523,610. Feeder mounted registration mechanisms typically are movable from an overhead position downwardly to a registration position on the platen surface for sheet registration and then are elevated again to allow movement of the document sheet past the registration position.

When the registration mechanism is mounted in a feeder, the document feeder must be accurately aligned with respect to the platen for proper functioning of the registration gate. In addition, when the feeder is moved from the platen area for manually making copies by the operator placing a document sheet on the platen, the operator first must place a second, copier-mounted, registration edge in position. Failure to move the second registration edge into position may result in the document sheets being out of registration when copies are made.

Some registration gate mechanisms, whether mounted overhead or on the copier main frame, have a series of spaced bars or feet against which the document sheet is driven for registration. The high speed impingement of the sheet against the relatively narrow width of the bars or feet sometimes causes the document sheet to be torn or otherwise damaged upon engagement of the sheet with the bars or feet.

In addition to the references previously noted, U.S. Pat. Nos. 3,804,514; 3,844,552; 3,937,454; 4,023,791 and 4,076,408 disclose registration mechanisms for copiers or the like. Other publications of interest are IBM Technical Disclosure Bulletin Vol. 17, No. 4, published in September 1974, page 1131; and IBM Technical Disclosure Bulletin Vol. 19, No. 12, dated May 1977, page 4496.

The registration mechanism of the present invention combines advantages of both an overhead (feeder) mounted registration mechanism and one that is mounted on the copier main frame. The mechanism of the invention provides a gate member having a continuous registration edge that produces a squeezing action on the document sheet, and the platen-gate member interface is simpler than some other registration mechanisms. Because the mechanism of the invention is mounted on the copier main frame it can be aligned independently of the document feeder, and it is always available for use without operator intervention, even when the feeder is raised for manual copying. In addition, the gate member is contoured to facilitate book copying.

SUMMARY OF THE INVENTION

In accordance with the present invention a registration mechanism for registering document sheets on a surface of a copier platen and at an edge of that platen includes a gate member comprising an elongate bar. The bar has first and second surfaces that are disposed at an obtuse angle and meet along an edge. The gate member is mounted for movement between a first position wherein the edge of the gate member extends along the edge of the platen for registering document sheets at the platen edge and a second position wherein the gate member is above its first position by a distance sufficient to allow movement of the document sheet past the platen edge.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE PREFERRED EMBODIMENT

Figure 1:
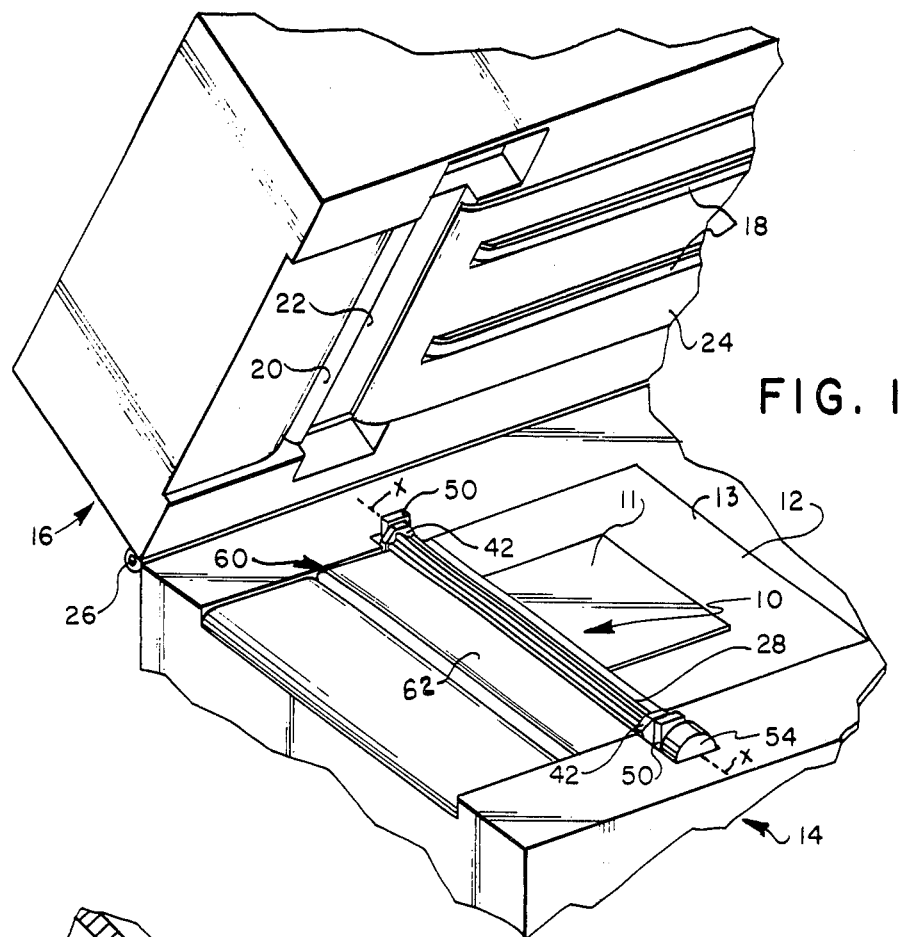
FIG. 1 is a perspective view of a portion of a copier/duplicator or the like showing a registration mechanism of the present invention and illustrating a recirculating document feeder mounted on the copier and positioned in an elevated position.

Referring now to the drawings in detail, a sheet registration mechanism of the present invention is shown generally at 10 and it is used for registering a document sheet 11 on a platen 12. The platen is part of a copier/duplicator or the like 14. The left end of the platen has a recessed step 15 that is lower than the upper surface 13 of the platen. The step 15 forms a sheet registration edge 17 at the left edge of surface 13.

Figure 2:
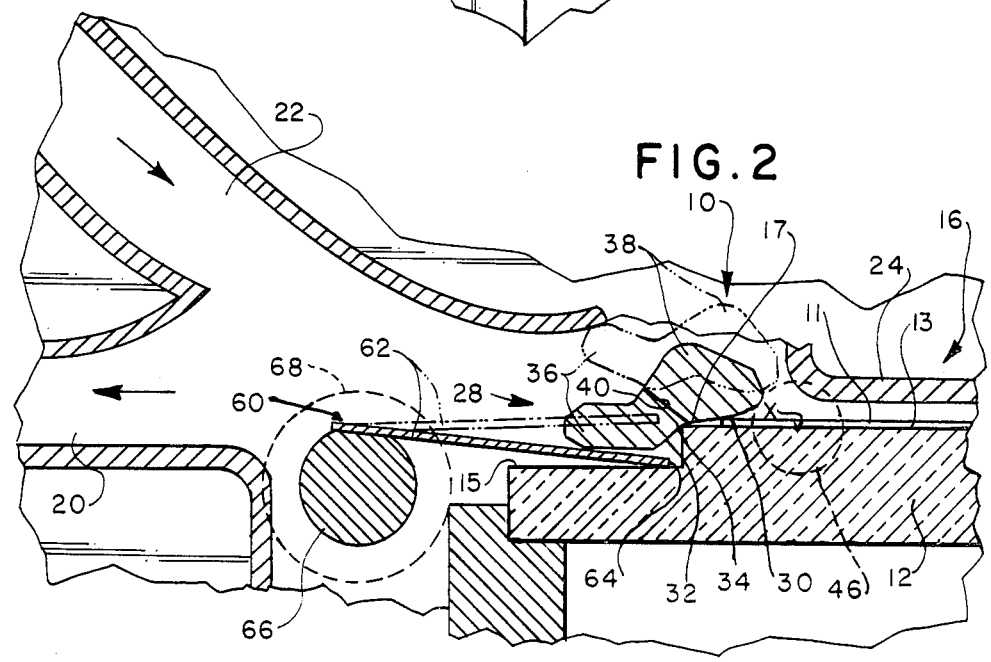
FIG. 2 is an enlarged fragmentary cross-section view of the registration mechanism and showing portions of the recirculating document feeder in its lowered position over the platen.

Mounted on the copier is a sheet feeder 16 that is movable between an elevated position (FIG. 1) and a lowered position (FIG. 2). When the feeder is in its elevated position a document sheet 11 can be manually positioned against the registration mechanism 10 to properly locate the sheet for exposure and copying by the copier 14. When feeder 16 is moved to its lowered position the feeder is effective to remove a sheet from a hopper or tray (not shown) in the top of the feeder and to advance the sheet across the platen surface into engagement with the mechanism 10 for registration prior to exposure and copying.

Advancement of the sheets across the platen toward the registration mechanism can be accomplished by a pair of vacuum drive belts 18, or by drive rollers as shown in commonly assigned U.S. Pat. No. 4,076,408. Reference is made to such patent for a more detailed description of a document feeder that is generally similar to the feeder such as shown at 16. After exposure of the sheet the mechanism 10 is raised and the sheet is driven from the platen and into an entrance sheet path 20 by the drive belts 18. A sheet entering path 20 can either be returned to the hopper of the feeder or it can be deflected into an exit or return path 22. The exit path 20 returns the document sheet onto the platen 12 where the drive belts 18 first move the sheet to the right or away from the registration mechanism 10 until the trailing edge of the sheet passes the mechanism. Then the mechanism is lowered and the drive belts 18 are reversed to again return the sheet into engagement with the registration mechanism. The sheet can be driven through the paths 20, 22 by drive rollers, belts or the like (not shown).

The feeder 16 has a lower plate 24 which is positioned just slightly above platen 12 when the feeder is in its lowered position. In addition, the feeder is hinged for movement between its two positions by any suitable means, such as hinge 26 shown located at the back edge of the copier.

Figure 3:
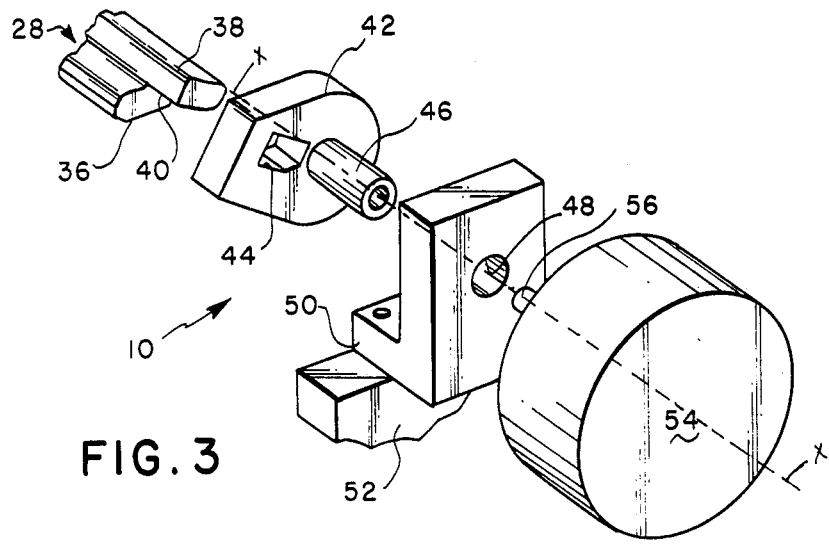
FIG. 3 is an enlarged fragmentary exploded view illustrating the mounting of a gate member of the registration mechanism.

Referring now to FIGS. 2 and 3 of the drawings, registration mechanism 10 has an elongate gate member 28. Preferably, member 28 comprises an elongate bar that is formed from an extrusion, for example. Bar 28 has a first flat surface 30 and a second flat surface 32 that diverge from a linear intersection straight line 34. Surfaces 30, 32 and line 34 extend the full length of the bar, and the bar extends the length of the edge 17 of the platen 12. In the preferred embodiment illustrated in the drawings, the surfaces 30 and 32 are disposed relative to each other to define an obtuse included angle of about 140° to 150°.

It is important that the gate member 28 be relatively stiff or rigid so that it can span the entire length of the platen 12 and still be sufficiently rigid to block movement of document sheets across the platen and to register the sheets at platen edge 17. Also, the bar preferably is very small (e.g., about 0.25 inch thick) so it tends to be flexible unless means are provided for making it relatively rigid. Therefore, the gate member 28 preferably has an elongate extension 36 which projects from surface 32 and extends rearwardly past the edge 17 of the platen and overlies the step 15 of the platen. In addition, gate member 28 preferably has a rounded or hump portion 38 at its top extending along the full length thereof. Extension 36 and rounded portion 38 limit the flexibility of the bar and thus increase the rigidity of the bar. In addition, portion 38 helps locate a book for copying as explained later.

When the gate member is positioned along the edge 17 of the platen 12 as shown in solid lines in FIG. 2, it extends the entire length of the platen and the surface 30 of the gate member is disposed at a small, acute angle of about 5°-15° relative to the upper surface 13 of platen 12. This location of surface 30 is desirable since it allows a document sheet being moved along platen surface 13 toward the gate to be moved into engagement with the surface 30 and gently squeezed between the surface 30 and the platen surface 13 as the sheet approaches its registered position against the gate member. This results in a slow, controlled stopping of the document sheet, as compared to the abrupt stopping produced by vertically disposed surfaces in the gate area that are located approximately 90° to the upper surface 13 of the platen.

FIG. 3 of the drawings illustrates one way in which the gate member 28 can be mounted for pivotable movement with respect to the platen 12 between its two positions. At each end of the gate member 28 the portion 36 of the gate member is cut away along a line shown at 40 in FIG. 2, thereby leaving an extension comprising the rounded portion 38 and the flat surface 30 of the bar. A lever 42 has an opening 44 in one end portion thereof which corresponds generally to the shape of the projecting portion of the gate member 28. This projecting portion of the gate member fits within opening 44 so that movement of the lever 42 effects movement of the gate member.

A cylindrical pivot 46 projects from the lever 42 in spaced relation to opening 44 and extends into an opening 48 in a mounting bracket 50. Bracket 50, in turn, is mounted on a frame member 52 which forms part of the frame of the copier. A rotary solenoid 54 has a pin 56 that is rotated in one direction (clockwise) when the solenoid is energized and rotated in the opposite direction (counterclockwise) when the solenoid is de-energized. Pin 56 fits into the opening in the cylindrical pivot 46 and is secured thereto so that the solenoid can rotate the pivot 46. Rotation of the pivot effects movement of the lever 42 to swing the gate member 28 through an arc between its solid and dotted line positions as shown in FIG. 2. In the solid line position the gate member is located at the edge of the platen for registering a sheet. In the dotted line position the gate member is in an elevated position above the platen surface to allow passage of a document sheet past the edge 17 of a platen in either of two opposite directions. Pivot 46 and gate member 28 rotate about an axis X which extends along the surface 13 of platen 12. Axis X is spaced from the registration edge 17 of the platen and is parallel to that edge. Thus the gate member swings upwardly and away from a sheet 11 registered at edge 17.

When gate member 28 is lifted and the sheet is driven from right to left across the platen edge it passes over a sheet deflector generally designated 60. Deflector 60 comprises an elongate, flat, sheetlike member 62 that has an upper surface along which document sheets can pass. The member 62 is positioned along the platen and has an edge 64 that is closely adjacent to the edge 17 of platen 12. The opposite side edge portion of deflector member 62 is secured to a rod or bar 66. Bar 66 is mounted for oscillating movement under control of suitable means, such as a rotary solenoid 68 similar to that shown at 54 and described hereinbefore. When the bar is rotated by the solenoid, deflector member 62 moves between its solid line position and dotted line position as shown in FIG. 2.

When member 62 is in its solid line position the edge 64 thereof rests on step 15 of the platen and it is located below the platen edge 17. Thus a sheet advanced from right-to-left over platen surface 13 is fed past the edge 17 of the platen, over edge 64 and steps down onto the upper surface of member 62. The upper surface of member 62 then guides the sheet into the guide path 20 where it is either returned to the tray in the feeder or the sheet is inverted and brought back toward the apparatus along path 22. After the leading edge of the sheet has moved past edge 64 and toward path 20, and before the leading edge returns along path 22, the member 62 is moved to its dotted line position as shown in FIG. 12 wherein the edge 64 of the member 62 is located above the edge 17 of the platen 12 so that the leading edge of the sheet returning in the left-to-right direction onto the platen surface 13 first moves across the surface of member 62 and then steps down onto the surface 13 near the edge 17 of the platen. After the leading edge of the sheet has passed over the edge 64 of member 62 and the edge 17 of the platen, the solenoid 68 is de-energized to return the member 62 to its lowered or solid line position where it is out of the way of a sheet being advanced across the edge of the platen in the right-to-left direction.

Figure 4:
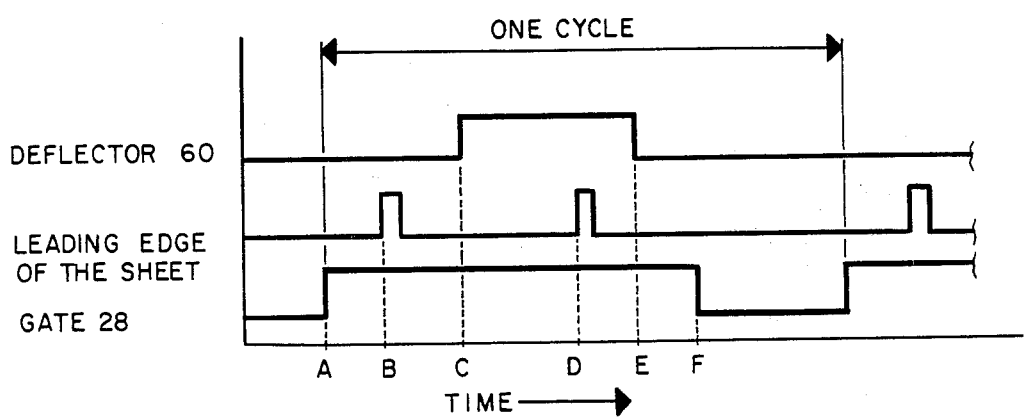
FIG. 4 is a timing diagram.

The operation of the apparatus of the invention will now be described in connection with the timing diagram illustrated in FIG. 4 of the drawings. It will be assumed initially that the deflector 60 is in its lowered position, gate member 28 is in its lowered or sheet registration position, and that the leading edge of the sheet has been positioned against the surface 30 of member 28 for properly registering the sheet on the platen 13. As noted previously, this can be accomplished either by manually positioning the document sheet on the platen or by means of the recirculating document feeder 16. The sheet is exposed in order to make a copy of the sheet. Then at point A in time the gate member 28 is moved to its raised position and the sheet is driven from the platen by the feeder drive means 18. At point B in time the leading edge of the sheet leaves the platen 12 and passes over the edge 17 thereof onto the upper surface of deflector member 62. Shortly thereafter, at point C in time, deflector member 62 moves upwardly to its dotted line position. The deflector remains there until the leading edge of the sheet returns along path 22, travels across the upper surface of deflector member 62 and over the edge 17 of the platen 12 and begins traveling along the upper surface 13 of the platen. In the timing diagram the point in time designated D is the time that the leading edge of the sheet again passes over the edge 17 of the platen traveling from left-to-right. Shortly thereafter, at time E, the deflector returns to its lowered or solid line position. At time F the gate member 28 returns to its lowered or registered position. The time interval between E and F provides a sufficient time delay to allow the trailing edge of the sheet to pass over the edge 17 of the platen. Then the drive means 18 is reversed to bring the sheet again into registration against the surface 30 of gate member 28. After the second side of the sheet is exposed, the gate member 28 is raised and the sheet is driven from the platen in a right-to-left direction. Normally after the second side of the sheet is exposed the sheet is returned to the hopper in the top of the recirculating feeder 16. Then the cycle is repeated for any additional document sheets.

When only one side of sheet 11 is copied, it is registered and exposed as previously explained for the first side of a document sheet. Then the gate member 28 is raised and the sheet is driven from the platen past edge 17 and back to the feeder hopper. Then gate member 28 is lowered for registration of the next sheet. For simplex document sheets, deflector 60 remains in the lowered position at all times.

For manual registration of document sheets, the feeder 16 is raised to its FIG. 1 position and gate member 28 is located in its solid line position. Sheet 11 is placed on platen surface 13 and manually moved into engagement with surface 30 of the gate member 28. After exposure, the sheet is manually removed. Gate member 28 and deflector 60 remain in their respective lowered positions at all times.

When a book is to be copied, gate member 28 is located in its lowered position and the feeder 16 is raised. The book page to be copied is placed face down on the platen and the portion of the book between two adjacent pages is placed over the rounded portion 38 of gate member 28. The rounded portion 38 supports the book and properly positions the page that is to be copied.

The apparatus of the present invention combines certain advantages of both an overhead registration gate and a gate of the type that is mounted on the main frame of the copier. The advantages of the overhead type gate that are incorporated in the present apparatus include the provision of a squeezing action on the document sheet, provided by the surface 30 being inclined to platen surface 13, which gently urges the document sheet downwardly against the platen. This provides for good control of the lead edge of the sheet. Also, the gate member 28 extends along the entire edge of the platen to provide a continuous registration edge and thereby avoid or reduce the kind of edge damage that is characteristically obtained by the use of fragmentary gates, such as fingers. Because the member 28 is pivoted at axis X located along the platen surface, the gate opening action is up and away from the platen in the direction of the document travel. Thus the gate does not interfere with the travel of the sheet. In addition, the platen-gate interface is far simpler than some previous platen-mounted or document feeder-mounted registration gates.

Advantages of a main frame mounted registration gate incorporated in the present apparatus include the relative ease of alignment of the gate relative to the platen. Also, such alignment is independent of the document feeder alignment or mounting on the copier. Another advantage is that a positive manual registration edge is always available even when the recirculating feeder is moved to its raised position, and without operator intervention as is required with some prior devices. Additionally, the rounded portion 38 of member 28 is contoured to fit nicely into the space between two sheets of a book and thus serves to support and position the book with a page flat against the platen for copying.

The invention has been described in detail with particular reference to a preferred embodiment thereof, but it will be understood that variations and modifications can be effected within the spirit and scope of the invention.

I claim:

1. In a copier having a frame, a platen supported by the frame, the platen having an edge and an upper surface, and sheet feeding apparatus mounted on the frame for movement between a first position directly over the platen and a second position away from the platen, the sheet feeding apparatus when in its first position being effective to move a document sheet across the platen surface (1) in a first direction wherein the leading edge of a document sheet is advanced toward the edge of the platen and (2) in a second direction wherein the leading edge of a document sheet is advanced in the opposite direction and away from the edge of the platen, and the sheet feeding apparatus when in its second position being spaced from the platen by a distance sufficient to allow document sheets, books or the like to be placed manually on the platen for copying, the improvement comprising:

a gate member comprising an elongate bar having a first surface and a second surface, the bar surfaces meeting along a line extending along the length of the bar and defining an obtuse angle;

means mounting the bar on the frame independent of the document feeder for pivotable movement about an axis extending along the platen surface parallel to the platen edge and spaced from the platen edge;

means for moving the bar about the axis between (1) a first position wherein the line between the bar surfaces extends along the platen edge and the first surface of the bar is above the platen surface and defines with the platen surface a small acute angle, and (2) a second position wherein the bar is raised from its first position so that the first and second surfaces are above the platen surface to allow movement of a document sheet along the platen surface and past the edge of the platen in either the first direction or the second direction; and a sheet deflector comprising an elongate member having a guide surface located alongside the platen, the deflector having an edge at the end of the deflector surface that is adjacent the edge of the platen, the deflector being movable between (1) a first position wherein the deflector edge is beneath the platen edge so that sheets advanced in the first direction past the platen edge pass over the deflector edge and (2) a second position wherein the deflector edge is above the platen edge so that sheets advanced in the second direction over the deflector surface and onto the platen surface pass over the platen edge.

2. The invention as set forth in claim 1 wherein the bar has a rounded upper portion shaped to be received into the space between sheets in a bound book or the like, thereby to support and register the book for copying of one page of the book.

3. The invention as set forth in claim 1 wherein the bar extends substantially the entire length of the platen edge, and the bar has an elongate extension which projects in a direction leading away from the platen edge.

4. In a copier having a frame, a platen supported by the frame, the platen having an edge and an upper surface, and sheet feeding apparatus mounted on the frame for movement between a first position directly over the platen and a second position away from the platen, the sheet feeding apparatus when in its first position being effective to move a document sheet across the platen surface toward the edge of the platen, and the sheet feeding apparatus when in its second position being spaced from the platen by a distance sufficient to allow document sheets, books or the like to be placed manually on the platen for copying, the improvement comprising:

a gate member comprising an elongate bar having a continuous registration surface extending along substantially the entire length of the bar, the length of the registration surface being substantially equal to the length of the platen edge;

means mounting the bar on the frame independent of the document feeder for pivotable movement about an axis extending along the platen surface parallel to the platen edge and spaced from the platen edge; and means for moving the bar about the axis between (1) a first position wherein the registration surface contacts substantially the entire length of the platen edge and (2) a second position wherein the bar is raised from its first position so that the registration surface is above the platen surface to allow movement of a document sheet along the platen surface and past the edge of the platen, the bar having a portion that overlies the platen surface when the bar is in its first position so that a document sheet can be registered on the platen surface by engagement between an edge of the sheet and said portion of the bar.

5. The invention as set forth in claim 4 wherein the bar has a second portion located beneath the platen edge when the bar is in its first position, and the bar having a third portion projecting from the second portion and shaped to limit flexing of the bar.

6. In a copier having a frame, a platen supported by the frame, the platen having an edge and an upper surface across which a document sheet is movable (i) in a first direction wherein the leading edge of a document sheet is advanced toward the edge of the platen and (ii) in a second direction wherein the leading edge of a document sheet is advanced in the opposite direction and away from the edge of the platen, the improvement comprising:

a gate member comprising an elongate bar having a continuous registration surface extending along the length of the bar;

means mounting the bar on the frame for pivotable movement about an axis extending along the platen generally parallel to the platen edge and spaced from the platen edge so that the bar surface can swing upwardly and away from the edge of the platen; and means for moving the bar about the axis between (i) a first position wherein the bar registration surface extends along the platen edge and projects above the platen surface; and (ii) a second position wherein the bar is raised from its first position so that the registration surface is above the platen surface by a distance sufficient to allow movement of a document sheet along the platen surface and past the edge of the platen in either the first direction or the second direction.

7. The invention as set forth in claim 6 further comprising a sheet deflector having a guide surface located alongside the edge of the platen, the deflector having an edge at the end of the guide surface that is adjacent the edge of the platen, the deflector being movable between (i) a first position wherein the deflector edge is beneath the platen edge so that sheets advanced in the first direction past the platen edge pass over the deflector edge and (ii) a second position wherein the deflector edge is above the platen edge so that sheets advanced in the second direction over the deflector surface and onto the platen surface pass over the platen edge.

* * * * *